United States Patent [19]

Ferguson

[11] Patent Number: 4,522,232
[45] Date of Patent: Jun. 11, 1985

[54] SHOWER FLOW CONTROLLER

[76] Inventor: Kenneth F. Ferguson, 16467 Seneca, Victorville, Calif. 92392

[21] Appl. No.: 373,300

[22] Filed: Apr. 30, 1982

[51] Int. Cl.³ .......................... F16K 5/04; F16K 5/10; B05B 1/30
[52] U.S. Cl. ................................ 137/625.32; 251/207; 251/209; 251/154; 239/562
[58] Field of Search ........................ 251/207, 209, 154; 137/625.32; 239/569, 562

[56] References Cited

U.S. PATENT DOCUMENTS

| 170,753 | 12/1875 | McGaffey | 137/625.32 X |
| 385,653 | 7/1888 | Wright | 239/569 X |
| 679,622 | 7/1901 | Hulings | 239/569 X |
| 963,136 | 7/1910 | Gibbs | 137/625.32 X |
| 1,116,298 | 11/1914 | Laciny | 251/154 X |
| 2,510,514 | 6/1950 | Mueller | 251/209 |
| 2,965,313 | 12/1960 | Jay | 251/207 X |
| 3,412,941 | 11/1968 | Steinback | 239/569 |

FOREIGN PATENT DOCUMENTS 791131 9/1934 France ........................... 251/207

Primary Examiner—Arnold Rosenthal
Attorney, Agent, or Firm—Knobbe, Martens, Olson & Bear

[57] ABSTRACT

A flow controller for connection between a shower supply pipe and a shower head is disclosed which provides an intense, highly atomized spray to the shower head while reducing the amount of water used, as well as the amount of energy necessary to heat the water. The flow controller contains a controlling shaft which directs two high velocity streams of water against a wall in the flow controller to atomize the water. The controlling shaft, which is movable to provide a continuously variable control over the amount of water flowing through the flow controller, is rotated by a convenient horseshoe-shaped handle to allow the user to easily change the amount of water supplied to the shower head.

9 Claims, 12 Drawing Figures

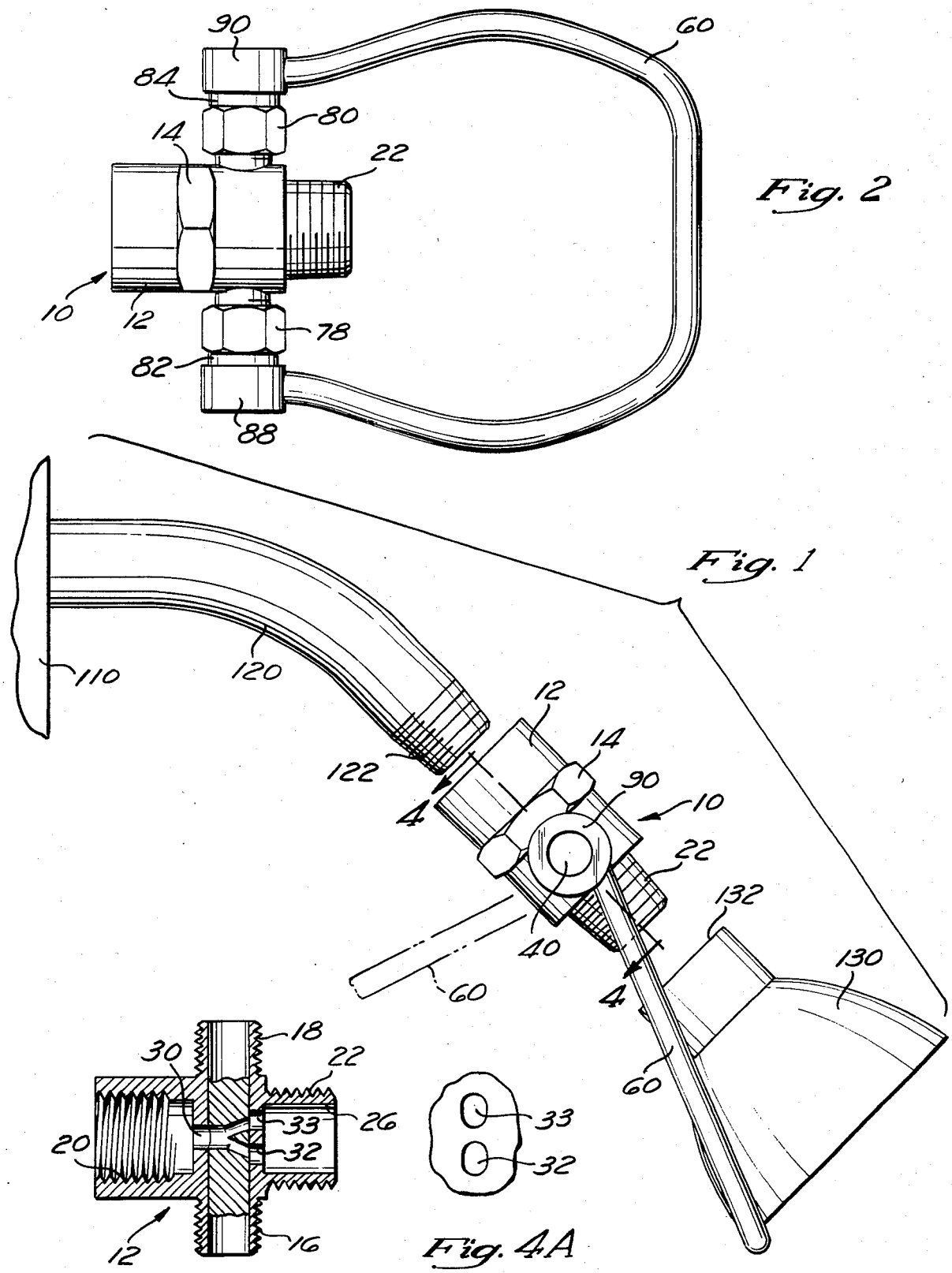

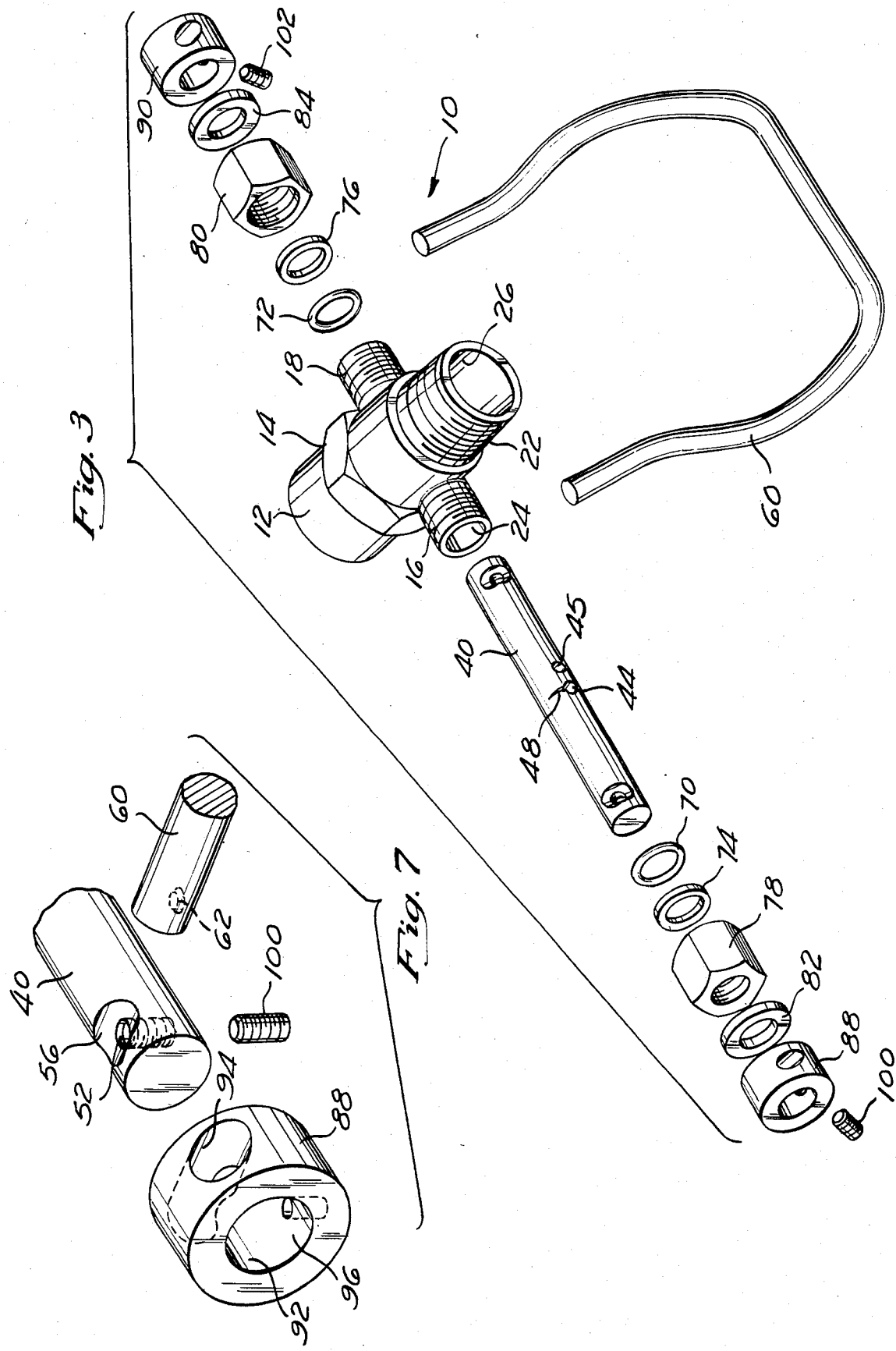

SHOWER FLOW CONTROLLER

BACKGROUND OF THE INVENTION

The recent awareness that our energy sources may no longer be viewed as limitless has been brought home to most Americans by dramatic increases in home energy costs. Aside from the more obvious cost of heating one's home, the largest home energy cost for most Americans is the cost of heating hot water for personal use and for laundry purposes.

The greatest amount of hot water used in the average home is that used for showering. The average shower uses about 10 gallons of hot water per minute. Since the cost of operating a hot water heater is directly proportional to the amount of hot water used, and even relatively short showers can use great quantities of hot water, the cost of showering daily has become quite expensive. This is particularly true in metropolitan areas of our country, where the energy costs are the highest.

An additional cost involved in showering is the cost in terms of our water resources, a cost which is felt more intensely in the arid Southwest. While the average adult drinks less than a gallon of water a day, the same average adult will use many gallons of water daily in showering. In fact, during periods of drought, governmental authorities frequently request people to shower every other day, rather than daily.

Both increased energy utilization efficiency and improved water conservation may be obtained by the simple step of reducing the amount of hot water used in showering. While the obvious solution is to minimize the amount of time spent in the shower, a more desirable solution is to reduce the amount of water flowing through the shower head.

It is recognized by the shower head industry that people prefer to have an intense spray generated from the shower head; this has led to the successful marketing of a number of shower heads producing a variety of intense sprays, many of these heads which are in 1982 priced in the $25-$35 price range. Recently, several manufacturers have introduced specialized shower heads which are designed to use less water than the older type of shower heads. The problem with these new, lower-volume shower heads is that they will operate properly only when full pressure is supplied to the shower head. If the pressure is lowered, the flow of water from the shower head is no longer as intense, resulting in reduced enjoyment by the person showering.

Since these shower heads will not work satisfactorily with lower pressure, the user may not turn down the pressure to the shower head in order to save water without sacrificing the stimulating spray of the shower head. Most users will choose personal satisfaction over energy conservation, and will operate their showers at full pressure.

A number of manufacturers market valves for use with shower heads to control the flow of water to the shower head without adjusting the main valves of the shower and varying the temperature of the water supplied to the shower head. Some of these valves are even built into shower heads. These valves are mostly of two types—the pushbutton type, where the user pushes a cylindrical button on one side of the valve to stop the flow of water, and on the other side of the valve to resume the full flow of water; and the rotating type valve, where the user turns a handle on the side of the valve fixture to control the flow of water. These valves have a number of significant disadvantages.

The first disadvantage of these valves is that they are extremely hard to use when the shower user is shampooing and is unable to open his eyes because of a full head of lather. He must then grope for the small handle of the valve in order to turn the water off or on.

A second disadvantage of valves for showerheads is that many of them do not provide a continuously variable control over the amount of water used. In other words, the user must decide between a full flow of water, and an extremely diminished flow of water which is not sufficient to provide a brisk spray from the shower head. With this type of valve, the user will generally keep the valve in its wide-open position, thus using an inordinately large amount of hot water.

Finally, since most of these valves are able to completely stop the flow of water to the shower head, there is a possibility that the user may leave the shower with the water turned on at the main valves, and turned off only at the secondary valve located near the shower head. This results in the pipe between the main valves and the shower head being left in a pressurized condition for a long period of time. Since this pipe was not intended to be left in such a pressurized condition for any period of time, there is a strong possibility that leaks in the pipe may develop. Such leaks, since they are within the wall of the house or apartment, may result in substantial damage to the structure.

SUMMARY OF THE INVENTION

The present invention is a shower flow controller which mounts between the supply pipe coming from the wall of the shower and the shower head. The flow controller features standardized thread, so it will fit on virtually any shower supply pipe, and may be utilized with virtually any shower head, including the specialized shower heads mentioned above. The flow controller may be installed by the user, since it requires only a single wrench and no mechanical ability to install.

The flow controller utilizes a cylindrical controlling shaft within a controlling body, the flow of water being controlled by the angular position of the controlling shaft. The controlling shaft is unique in that it uses a Y-principle, that is, one inlet hole used to supply water to two outlet holes. The two outlet holes are angled and sized so that water will be directed under pressure to the walls of the flow controller, thus causing the water to be atomized into a fine spray, and to be supplied to the shower head in this state. Thus, even with a small flow of water, a fine spray of water will be supplied from the flow controller to the shower head, a result which is of great importance to the shower users.

Because the flow controller is capable of atomizing water even when only small quantities are being allowed through the flow controller, the shower may be operated with significantly less water, thus resulting in a saving of energy required to heat the water, as well as conservation of the water itself.

Another feature of the flow controller is that it has a large horseshoe-shaped handle, which may be operated with ease even when the shower user has a full head of lather and is unable to see the flow controller. The shape of the handle also makes it very easy to continuously vary the flow of water from the maximum amount down to the minimum amount.

Finally, the flow controller is designed so that even when the handle is in the extreme minimum flow position, a small amount of water will still be supplied from the shower head. This feature prevents the user from leaving the shower with the main valves turned on, and thus guards against wall damage caused by leakage of the supply pipe within the wall.

DESCRIPTION OF THE DRAWINGS

These and other advantages of the present invention are best understood with reference to the drawings, in which:

FIG. 1 is a side view of the flow controller showing the way in which it is installed to the supply pipe and the shower head;

FIG. 2 is a top view of the flow controller of FIG. 1, showing its general configuration;

FIG. 3 is an exploded perspective view of the flow controller;

FIG. 4 is a cross-sectional view of the flow controller body and the cylindrical controlling shaft of FIG. 1, with the shaft in the fully open position;

FIG. 4A is an end view of the outlet holes of the flow controller body of FIG. 4;

FIG. 7 is an exploded perspective view of the collar assembly connecting the horseshoe-shaped handle to the controlling shaft;

DETAILED DESCRIPTION OF THE PREFERRED EMBODIMENT

Figure 6B:
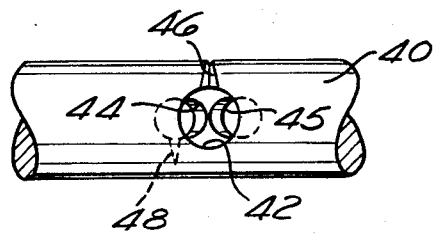
FIG. 6B is a top view of the controlling shaft shown in FIG. 5, and shows the Y-inlet hole and the inlet wedge crease.

The shower flow controller of the present invention is shown fully assembled in FIGS. 1 and 2. FIG. 1 shows the flow controller 10 as it is installed in a conventional shower. A shower pipe 120 which extends from the shower wall 110 has a threaded outlet 122. Normally, a shower head 130 with a threaded inlet area 132 would be installed on the shower pipe 120; the shower head 130 is removed from the shower pipe 120 in order to install the flow controller 10. The flow controller 10 has a threaded inlet 20 (shown in FIG. 4) which is screwed onto the threaded outlet 122 of the shower pipe 120. The body 12 of the flow controller 10 has a hexagonal portion 14, which may be gripped by a wrench (not shown) to assist in the installation of the flow controller 10. The shower head 130 is then screwed on to the threaded outlet 22 of the flow controller 10 to complete the installation.

A horseshoe-shaped handle 60 is used to control the amount of water passed by the flow controller 10 by varying the position of a cylindrical controlling shaft 40. When the handle 60 is in the position shown in solid lines in FIG. 1, the flow controller 10 is in its fully open position; when the handle 60 is in the position indicated with phantom lines in FIG. 1, the flow controller 10 is in its fully closed position, allowing only a trickle of water to reach the shower head 130.

The flow controller 10 is shown in an exploded perspective view in FIG. 3. The cylindrical controlling shaft 40 is inserted into the cylindrical bore 24 of the flow controller body 12 so that an equal portion of the controlling shaft 40 extends from each of the threaded bore ends 16, 18. O-rings 70, 72 are installed onto the ends of the controlling shaft 40, followed by washers 74, 76. Gland nuts 78, 80 are then installed over the ends of the controlling shaft 40, and screwed onto the threaded bore ends 16, 18, respectively. This portion of the flow controller assembly operates to control the flow of water by varying the position of the controlling shaft 40, and also functions to seal the body 12 of the flow controller 10.

The horseshoe-shaped handle 60 must now be mounted onto the controlling shaft 40 in a secure manner; the assembly of one end of the handle 60 to the shaft 40 is shown in the exploded view of FIG. 7. An Allen screw 100 is screwed into a threaded hole 52 in the controlling shaft 40. The end of the controlling shaft 40 is then inserted into the collar bore 92 of collar 88. One end of the horseshoe-shaped handle 60 is then inserted into the cylindrical receiving portion formed by the collar hole 94 of the collar 88 and the curved recess portion 56 of the controlling shaft 40. The end of the horseshoe-shaped handle 60 is inserted with the dimple 62 facing toward the Allen screw 100. An Allen wrench (not shown) is inserted through the Allen wrench hole 96, and the Allen screw 100 is tightened into the dimple 62, thus retaining the horseshoe-shaped handle 60 in place.

It should be noted that the Allen wrench hole 96 is sized so that an Allen wrench may easily fit through the hole, but the Allen screw 100 may not fall through the hole 96. This is to prevent the Allen screw 100 from falling onto the floor of the shower and possibly causing injury to the foot of the shower user if the Allen screw 100 is stepped on.

The other collar 90 is installed on the other end of the controlling shaft 40 and receives the other end of the horseshoe-shaped handle 60 in the same manner. It has been found desirable to install anti-friction alignment washers 82, 84 between the gland nuts 78, 80 and the collars 88, 90, respectively. The anti-friction alignment washers serve both to prevent friction between the collars 88, 90 and the gland nuts 78, 80, respectively, when the collars 88, 90 move with the handle 60 and the controlling shaft 40 to adjust the flow of water through the flow controller 10, and also to maintain alignment of the controlling shaft with the body 12 of the flow controller 10.

The key to the flow controller of the present invention being able to function with reduced volumes of water is the Y-shaped structure of the controlling shaft 40 and the flow controller body 12, best shown in the cross-sectional view of FIG. 4. Water will enter the flow controller through the shower pipe 120 to an inlet hole 30, will flow into the Y-shaped passage of the controlling shaft 40 through the Y-inlet hole 42, and will exit through the two outlet holes 32, 33. The Y-shaped passage in the controlling shaft 40 is shown in detail in FIG. 5, where the Y-inlet hole 42 is the leg of the Y-shaped passage, and the Y-outlet holes 44, 45 are the arms of the Y-shaped passage. The area of the Y- inlet hole 42 is larger than the combined areas of the two Y-outlet holes 44, 45. Thus, water entering the Y-inlet hole 46 will exit the Y-outlet holes 44, 45 under pressure at a high flow velocity, and in streams which are directed outwardly.

Returning now to FIG. 4, it can be seen that these outwardly directed streams from the Y-outlet holes 44, 45 are directed through the two outlet holes 32, 33, respectively, against the outlet wall 26. The outlet holes 32, 33 are oval-shaped rather than round, as shown in FIG. 4A, to allow the streams of water exiting the Y-outlet holes 44, 45 of the controlling shaft 40 to reach the outlet walls 26 without being impeded. When the fast-moving pressurized streams of water hit the outlet wall 26, the water is atomized to a high pressure, finely misted spray. A high pressure spray obtained in this manner is the key to the ability of the flow controller of this invention to utilize a lower volume of water.

Figure 5:
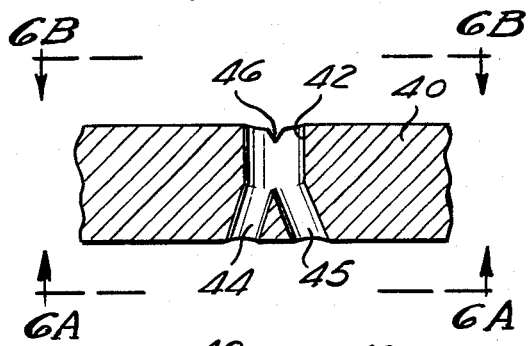
FIG. 5 is an enlarged, cross-sectional view of the cylindrical controlling shaft shown in FIG. 4.

The maximum volume of water that will flow through the flow controller 10 in a given period of time is controlled by the size of the holes in the controlling shaft (FIG. 5). If the holes are made smaller, of course, the flow rate will be lowered proportionally. The important relationship which must be maintained is that the area of the Y-inlet hole 42 must be larger than the combined areas of the two Y-outlet holes 44, 45, so that a pressurized high flow velocity stream will leave the Y-outlet holes 44, 45. It has been determined that the maximum flow rate produced by the valve should be around six gallons per minute. This will produce a shower stream through any shower head which is sufficiently intense to please even those requiring the most invigorating and forceful of showers, while still requiring less hot water than a typical shower head.

Figure 6A:
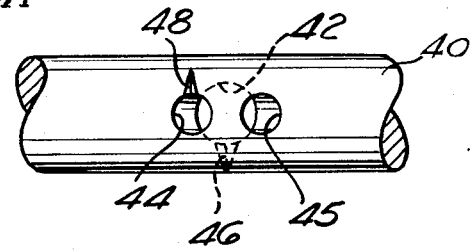
FIG. 6A is a bottom view of the controlling shaft shown in FIG. 5, showing the Y-outlet holes and the outlet wedge crease.

As discussed earlier, it is also desirable to have a continuously variable control on the flow rate. This is obtained by using wedge grooves or creases on the controlling shaft. These creases are shown in FIGS. 5, 6A, and 6B. An inlet wedge crease 46 is shown radiating from the Y-inlet hole 42, and an outlet wedge crease 48 is shown radiating from the Y-outlet hole 44. Each of the wedge creases 46, 48 is of greatest depth immediately adjacent the Y-inlet hole 42, or the Y-outlet hole 44, respectively, and the depth of the creases 46, 48 decreases to zero as shown in the Figures. The inlet wedge crease 46 is larger than the outlet wedge crease 48 for the same reason the area of the Y-inlet hole 42 is larger than the combined areas of thw two Y-outlet holes 44, 45—to ensure that the stream of water leaving the controlling shaft 40 is at a pressurized high flow velocity.

Figure 8A:
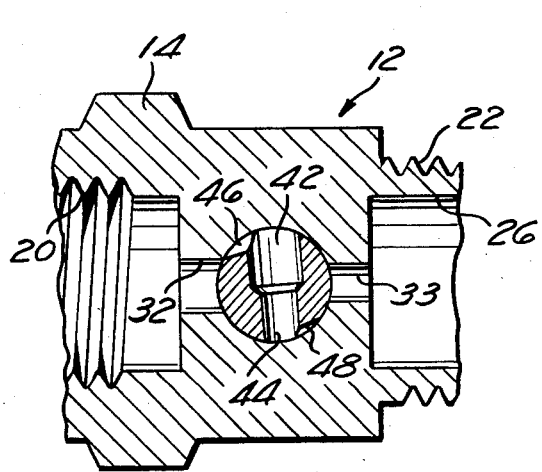
FIG. 8A is a sectional view of the flow controller body and the controlling shaft in the closed position.
Figure 8B:
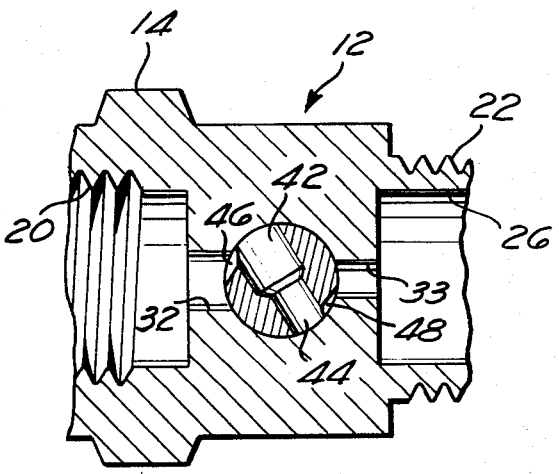
FIG. 8B is a sectional view of the flow controller body and the controlling shaft in the partially-open position wherein water flows through the wedge creases shown in FIGS. 6A and 6B.
Figure 8C:
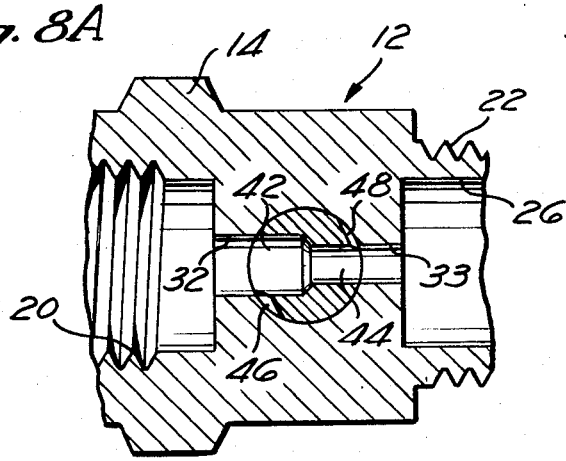
FIG. 8C is a sectional view of the flow controller body and the controlling shaft in the fully open position.

The operation of the controlling shaft 40 with the wedge creases 46, 48 is shown in FIGS. 8A, 8B, and 8C. In FIG. 8C, the flow controller 10 is shown in the fully open position, and the maximum amount of water flow is obtained through the Y-inlet hole 42 and the Y-outlet holes 44, 45. In FIG. 8B, the controlling shaft 40 has been turned so that the holes 42, 44, 45 in the controlling shaft 40 are no longer aligned with the holes 30, 32, 33 in the flow controller body 12. Nevertheless, a lesser amount of water is allowed to flow through the flow controller 10, by flowing through the inlet wedge crease 46, the Y-shaped passage in the flow controller 40, and out through the outlet wedge crease 48. It is important to note again that the area of the inlet wedge crease 46 is so configured as to be slightly larger than the outlet wedge crease 48, thus causing water exiting through the outlet wedge crease 48 to be pressurized and at a highly forceful flow velocity, causing it to impact against the outlet walls 26 and become vaporized, even though the overall rate of water flow through the controller 10 is considerably reduced.

In FIG. 8A, the controlling shaft 40 is shown so that neither the holes 42, 44, 45 nor the wedge creases 46, 48 of the controlling shaft 40 are aligned with the holes 30, 32, 33 in the flow controller body 12. However, the tolerances of the controlling shaft 40 and the flow controller body 12 are maintained so that when the controlling shaft 40 is in the position shown in FIG. 8A, the minimal flow position, a small amount of water will be able to leak through the areas between the controlling shaft 40 and the flow controller body 12. This small amount of water, generally amounting to about 10–12 ounces per minute, is maintained to ensure that the user turns off the main valve before leaving the shower area. This safety feature prevents the user leaving the shower area with the pressure maintained in the shower pipe, and the possibility of leaks within the wall from the shower pipe causing structural damage.

Thus, it can be seen that through the use of the wedge creases 46, 48, by rotating the controlling shaft 40, the user can control the flow of water in a continuously variable manner to a substantially greater extent than is possible in the use of prior art field mechanisms. In a flow controller 10 which is sized to provide a six gallon per minute maximum flow, it has been determined that the flow can be lowered to as low as one gallon per minute while still maintaining the atomization and intensity of spray which most shower users prefer, and providing a more than sufficient amount of water with which to lather and rinse. In order to obtain the same spray intensity that a standard shower head without the flow controller produces by using 8–10 gallons per minute, the flow controller of the present invention, when used with the same shower head, requires only $2\frac{1}{2}$–3 gallons per minute to produce a shower of the same intensity. Thus, it can be seen that by using the flow controller of the present invention, a substantial savings in the amount of water used in a shower is obtained. Since less water is used, less water must be heated, and consequently a large saving in energy required to heat the water is also obtained.

The flow controller will fit on any standard shower fixture, and may be installed easily and quickly. The flow may be controlled over a wide range, to produce anything from a stinging spray to a trickle. The safety trickle feature prevents possible wall damage caused by leaving the main shower valve on. Finally, because of the horseshoe-shaped handle, the flow controller may be easily adjusted even when the user is unable to see because of having lather in his face.

What is claimed is:

1. A flow controller for interconnecting a shower pipe to a shower head or the like, comprising:
   an input end structure having an internally threaded inlet for connection to said shower pipe, said inlet including an inlet aperture;
   an output end structure having an externally threaded outlet for connection to said shower head, said outlet forming an outlet cavity having an axis in the direction of said flow and an inner cavity side wall;
   means for controlling the flow of water, said means disposed between said input end structure and said output end structure, said means containing a Y-shaped passage therethrough, said passage comprising:

(a) an inlet portion forming the leg of said Y-shaped passage, said inlet portion for receiving the flow of water from said inlet aperture; and (b) two outlet portions forming the arms of said Y-shaped passage, said outlet portions having walls for directing said flow of water, said walls terminating at a location spaced from said cavity side wall toward said axis, said walls aligned to direct the entire flow of water directly at said inner cavity side wall to atomize said water inside said output end structure, said cavity side wall defining an outlet end of considerably larger cross section than the greatest distance between said walls of said controller outlet portions; and said controlling means comprising a controlling shaft rotatably movable with respect to said input end structure and said output end structure to selectively vary the flow of water through said Y-shaped passage by varying the alignment between said inlet portion and said inlet aperture.

2. A flow controller as defined in Claim 1, further including two outlet apertures disposed in said end structure and adjacent said controlling means, wherein said controller shaft varies the alignment between said outlet portions and said outlet apertures.

3. A flow controller as defined in claim 2, wherein said inlet portion contains a wedge-shaped crease configured to reduce the area in common between said inlet portion and said inlet aperture as said controlling means is moved to restrict said flow of water, a portion of said area in common existing in all various positions of said controlling means.

4. A flow controller as defined in claim 3, wherein at least one of said outlet portions contains a wedge-shaped crease configured to reduce the area in common between said outlet portion and said outlet aperture as said controlling means is moved to restrict said flow of water, said area in common existing in all various positions of said controlling means.

5. A flow controller as defined in claim 4, wherein the cross-sectional area of said wedge-shaped crease in said outlet portion is smaller than the cross-sectional area of the wedge-shaped crease in said inlet portion to provide a high velocity flow of water from said outlet portion.

6. A flow controller as defined in claim 2, wherein said controlling means allows a small amount of water to flow when said controlling means is providing the maximum restriction on water flow through the controller.

7. A flow controller as defined in claim 2, wherein said outlet apertures are of an oval or angular configuration to prevent obstruction of each stream of water as it flows from said outlet apertures.

8. A flow controller as defined in claim 1, wherein said inlet portion has an area smaller than the area of said input end structure to limit the maximum flow of water through said flow controller.

9. A flow controller as defined in claim 1, wherein said inlet portion has a first predetermined area, and said outlet portions each have a second predetermined area less than one-half of said first predetermined area, to provide a high velocity flow from said outlet portions.

* * * * *